(12) United States Patent
Radgowski (10) Patent No.: US 11,359,934 B2
(45) Date of Patent: Jun. 14, 2022

(54) VARIABLE RATE MONITORING IN FLOW-BASED METERING SYSTEMS

(71) Applicant: Landis+Gyr Innovations, Inc., Alpharetta, GA (US)

(72) Inventor: John Radgowski, Midlothian, VA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 0 days.

(21) Appl. No.: 16/828,655

(22) Filed: Mar. 24, 2020

(65) Prior Publication Data

US 2021/0302199 A1    Sep. 30, 2021

(51) Int. Cl.
  *G01D 4/00* (2006.01)
  *G06Q 50/06* (2012.01)
  *G01F 15/06* (2022.01)

(52) U.S. Cl.
  CPC ............ *G01D 4/004* (2013.01); *G06Q 50/06* (2013.01); *G01F 15/06* (2013.01)

(58) Field of Classification Search
  CPC ......... G01D 4/004; G06Q 50/06; G01F 15/06
  See application file for complete search history.

(56) References Cited

U.S. PATENT DOCUMENTS

| | | | |
|---|---|---|---|
| 6,615,147 B1 | 9/2003 | Jonker et al. | |
| 6,816,360 B2 | 11/2004 | Brooksby et al. | |
| 7,135,850 B2 | 11/2006 | Ramirez | |
| 7,469,190 B2 | 12/2008 | Bickel | |
| 7,522,639 B1* | 4/2009 | Katz | H04Q 9/00 370/503 |
| 7,693,670 B2 | 4/2010 | Durling et al. | |
| 7,990,806 B2 | 8/2011 | Chen | |

(Continued)

FOREIGN PATENT DOCUMENTS

| | | |
|---|---|---|
| WO | 2009/110192 A1 | 9/2009 |
| WO | 2018/068098 A1 | 4/2018 |

(Continued)

OTHER PUBLICATIONS

PCT Patent Application No. PCT/US2021/023307, International Search Report and Written Opinion, dated Jul. 19, 2021, 13 pages.

*Primary Examiner* — Amine Benlagsir
(74) *Attorney, Agent, or Firm* — Kilpatrick Townsend & Stockton LLP (57) ABSTRACT

Certain aspects and features include techniques for reporting resource flow at a metering device. In an example, a metering device measures resource flow by measuring a pressure or a flow rate. The metering device sets a reporting rate to a default reporting rate. The metering device transmits communications indicating the measured resource flow to an external device at the reporting rate. The metering device detects seismic activity at the metering device. The metering device determines that the seismic activity exceeds a seismic threshold. The metering device, in response to determining that the seismic activity exceeds the seismic threshold, adjusts the reporting rate to an event reporting rate, and starts an event time period. The metering device, transmits communications indicating the measured resource flow to the external device at the event reporting rate during the event time period.

22 Claims, 5 Drawing Sheets

(56) References Cited

U.S. PATENT DOCUMENTS

| | | |
|---|---|---|
| 8,004,933 B2 | 8/2011 | Iseli |
| 8,121,741 B2 | 2/2012 | Taft et al. |
| 8,223,466 B2 | 7/2012 | Roscoe |
| 8,322,215 B2 | 12/2012 | Lakich et al. |
| 8,326,554 B2 | 12/2012 | Caird |
| 8,635,036 B2 | 1/2014 | Pamulaparthy et al. |
| 8,754,634 B2 | 6/2014 | Chamarti et al. |
| 8,830,083 B2 | 9/2014 | LaFrance et al. |
| 8,854,217 B2 | 10/2014 | Brown et al. |
| 8,947,246 B2 | 2/2015 | Aiken |
| 8,978,443 B2 | 3/2015 | Ramirez |
| 8,996,144 B2 | 3/2015 | LaFrance et al. |
| 9,164,135 B2 | 10/2015 | Cs et al. |
| 9,304,014 B2* | 4/2016 | Komati ............ G01D 4/00 |
| 9,341,686 B2 | 5/2016 | Deak et al. |
| 9,476,740 B2 | 10/2016 | Zigovszki et al. |
| 9,557,392 B2 | 1/2017 | Schuhl et al. |
| 9,602,895 B2 | 3/2017 | Bowling et al. |
| 9,671,254 B2 | 6/2017 | Zigovszki et al. |
| 9,887,051 B2 | 2/2018 | LaFrance et al. |
| 9,891,088 B2 | 2/2018 | Zigovszki et al. |
| 10,240,961 B2 | 3/2019 | Cheng et al. |
| 10,254,315 B2 | 4/2019 | Higashi et al. |
| 10,295,578 B2 | 5/2019 | Higashi et al. |
| 2002/0026957 A1* | 3/2002 | Reyman ............ F16K 17/36 137/39 |
| 2011/0074600 A1* | 3/2011 | Cornwall ............ G01D 4/004 340/870.02 |
| 2012/0274440 A1* | 11/2012 | Meadows ............ G01V 1/008 340/3.42 |
| 2014/0180761 A1* | 6/2014 | Yolles ............ G06Q 10/06311 705/7.29 |
| 2016/0351028 A1 | 12/2016 | Brennan, Jr. et al. |
| 2017/0307466 A1* | 10/2017 | Brennan, Jr. ....... G01M 3/2807 |
| 2018/0073910 A1 | 3/2018 | Deak et al. |
| 2018/0106640 A1 | 4/2018 | Padrones et al. |
| 2018/0234748 A1 | 8/2018 | Haddy et al. |
| 2019/0041439 A1 | 2/2019 | Brown |
| 2019/0094329 A1 | 3/2019 | Minich |
| 2019/0101411 A1 | 4/2019 | Davis et al. |
| 2019/0219618 A1 | 7/2019 | Davis et al. |
| 2020/0059709 A1* | 2/2020 | Petkov ............ G01D 4/002 |
| 2020/0173810 A1* | 6/2020 | Verma ............ H04L 67/125 |

FOREIGN PATENT DOCUMENTS

| | | |
|---|---|---|
| WO | 2018072030 A1 | 4/2018 |
| WO | 2018083902 A1 | 5/2018 |
| WO | 2019026791 A1 | 2/2019 |

* cited by examiner

VARIABLE RATE MONITORING IN FLOW-BASED METERING SYSTEMS

TECHNICAL FIELD

This disclosure relates generally to flow-based resource distribution systems and more specifically to metering systems that can dynamically adjust a frequency of flow rate reporting based on seismic activity or flow rate.

BACKGROUND

Flow-based metering devices are used to measure consumption of resources like gas and water and to resource consumption to an external device such as a head end system. In some cases, metering devices can be installed in geographic locations that have a risk of seismic activity. But seismic activity can damage distribution lines, for example, by causing a gas line to break, creating a risk of fire or explosion. Therefore, a need exists for metering devices that can detect seismic activity.

SUMMARY

Certain aspects and features include techniques for reporting resource flow at a metering device. In an example, a metering device measures resource flow by measuring one or more of a pressure or a flow rate. The metering device sets a reporting rate to a default reporting rate. The metering device transmits communications indicating the measured resource flow to an external device at the reporting rate. The metering device detects seismic activity at the metering device. The metering device determines that the seismic activity exceeds a seismic threshold. The metering device, in response to determining that the seismic activity exceeds the seismic threshold, adjusts the reporting rate to an event reporting rate, and starting an event time period. The metering device, transmits communications indicating the measured resource flow to the external device at the event reporting rate during the event time period.

In another example, a metering device measures resource flow. The metering device measures one or more of a pressure or a flow rate. While operating in a default mode, the metering device performs operations. The operations include setting a reporting rate to a default reporting rate. The operations further include transmitting communications indicating the measured resource flow to an external device at the reporting rate. The operations further include detecting seismic activity at the metering device. The operations further include determining that the seismic activity exceeds a seismic threshold. The operations further include in response to determining that the seismic activity exceeds the seismic threshold, beginning to operate in an event mode. While operating in the event mode, the metering device adjusts the reporting rate to an event reporting rate and transmits communications indicating the measured resource flow to the external device at the event reporting rate.

In another example, a metering device includes a radio configured to communicate with an external device, a seismic sensor configured to measure movement of the metering device in one or more dimensions, a flowrate sensor configured to measure one or more of flow rate or pressure and a processor. The processor is configured to perform operations. The operations include receiving, from the flowrate sensor, a measurement of resource flow by measuring one or more of a pressure or a flow rate. The operations further include setting a reporting rate to a default reporting rate. The operations further include causing the radio to transmit a communications indicating the measured resource flow to an external device at the reporting rate. The operations further include receiving, from the seismic sensor, a measurement of seismic activity at the metering device. The operations further include determining that the measurement of seismic activity exceeds a seismic threshold. The operations further include in response to determining that the measurement of seismic activity exceeds the seismic threshold, adjusting the reporting rate to an event reporting rate, and starting an event time period. The operations further include during the event time period, causing the radio to transmit communications indicating the measured resource flow to the external device at the event reporting rate.

These illustrative examples are mentioned not to limit or define the disclosure, but to provide examples to aid understanding thereof. Additional examples and further description are provided in the Detailed Description.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Aspects of the present disclosure relate to improved flow-based metering systems such as gas meters. In particular, disclosed metering systems can detect seismic activity and/or resource flow and dynamically adjust a reporting rate at which a resource flow rate is reported to an external device such as a headend system. In this manner, utilities can more quickly react to damaged distribution lines caused by seismic events such as earthquakes.

Further, disclosed metering systems can enable low power consumption while responding to such events. Metering systems are typically battery-powered and therefore typically communicate infrequently to maintain meter power consumption as low as possible. Disclosed techniques involve communications with a network or a headend when necessary, e.g., on a more frequent basis following a seismic event, but also facilitate a return to lower power consumption over time or when directed by a head end.

In a simplified example, a metering system measures a gas flow rate and reports the gas flow rate to an external device on a periodic basis, for example, at a default resource flow reporting rate. If the metering system detects seismic activity, e.g., by an accelerometer or seismometer detecting an activity that is greater than a threshold, the metering system reports the resource flow at an event reporting rate, which can be higher than the default reporting rate for an event time period. During the event time period, if the measured resource flow exceeds a flow rate threshold, or example, indicating that an earthquake has damaged a gas line and caused a leak, the gas meter adjusts the reporting rate to an exception reporting rate. The exception reporting rate can be higher than the event reporting rate.

Accordingly, using information received from one or more metering systems, a head end can determine that a seismic event has occurred and whether any damage has been sustained to the distribution network. A utility can then take appropriate action such as remotely disconnecting one or more end user premises from the distribution network or sending engineers to address the damage.

Figure 1:
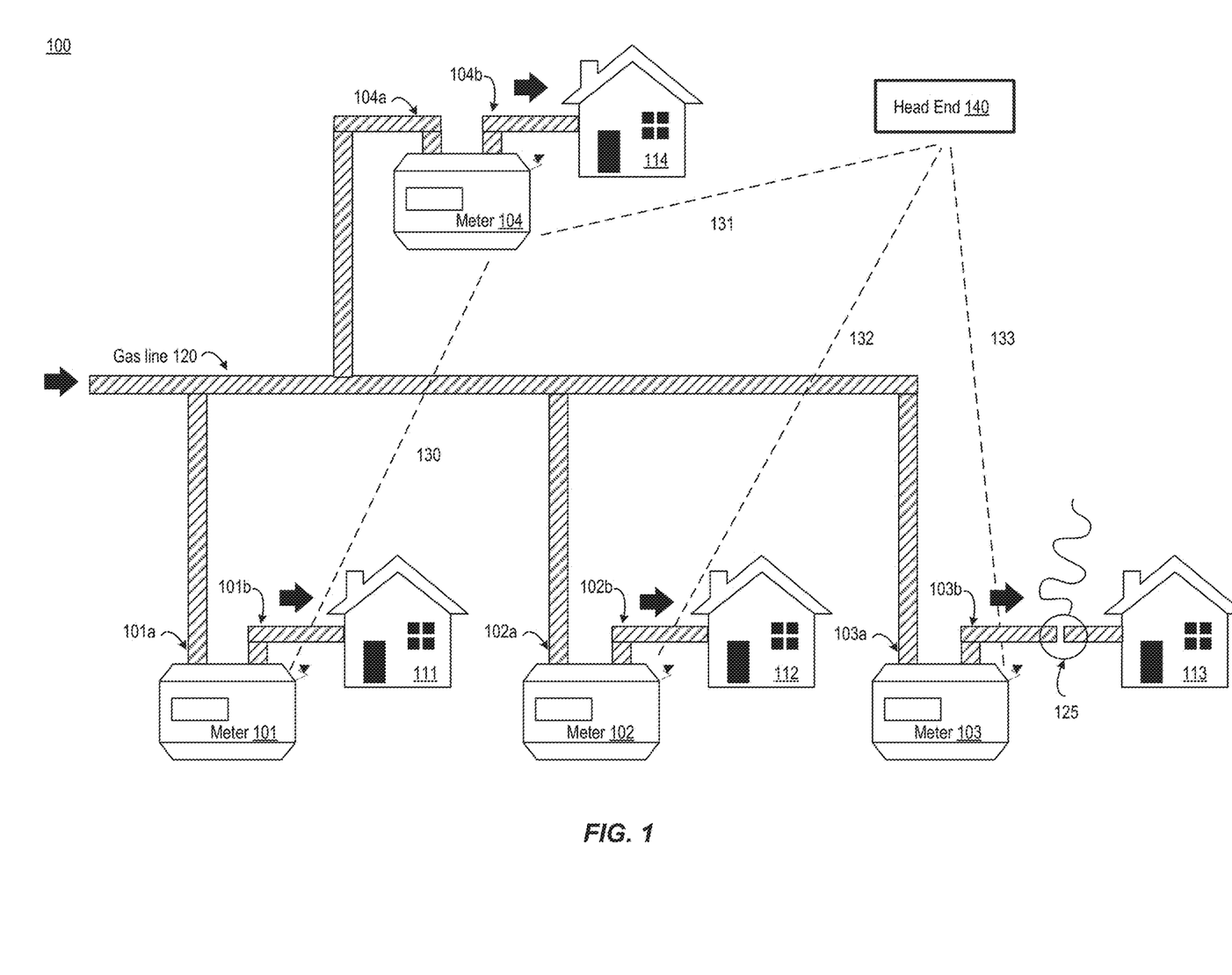
FIG. 1 is a schematic of an exemplary network of metering systems, according to an aspect of the present disclosure.

Turning now to the Figures, FIG. 1 is a schematic of an exemplary network of metering systems, according to an aspect of the present disclosure. FIG. 1 depicts distribution environment 100, which includes one or more of meters 101-104, end user premises 111-114, gas line 120, damaged gas line 125, head end 140, and network connections 130-133.

In the example depicted by FIG. 1, gas line 120 provides gas to meters 101-104, which in turn provide gas to end user premises 111-114 respectively. While meters 101-104 are gas meters, aspects of the present disclosure apply equally to other resources that can be measured using a flow rate such as water. Meters 101-104 may be located on the outside or inside of their respective premises.

Meters 101-104 measure flow or flow rate (e.g., volume per time) and/or pressure. Pressure can be indicative of flow rate. For example, a reduced pressure can indicate that more gas is flowing. Each of meter 101-104 has a gas input and a gas output. For example, as gas flows from input 101$a$ through meter 101 to output 101$b$, meter 101 registers a flow rate. Similarly, as gas flows from input 102$a$ through meter 102 to output 102$b$, meter 102 registers a flow rate, as gas flows from input 103$a$ through meter 103 to output 103$b$, meter 103 registers a flow rate, and as gas flows from input 104$a$ through meter 104 to output 104$b$, meter 104 registers a flow rate.

Figure 2:
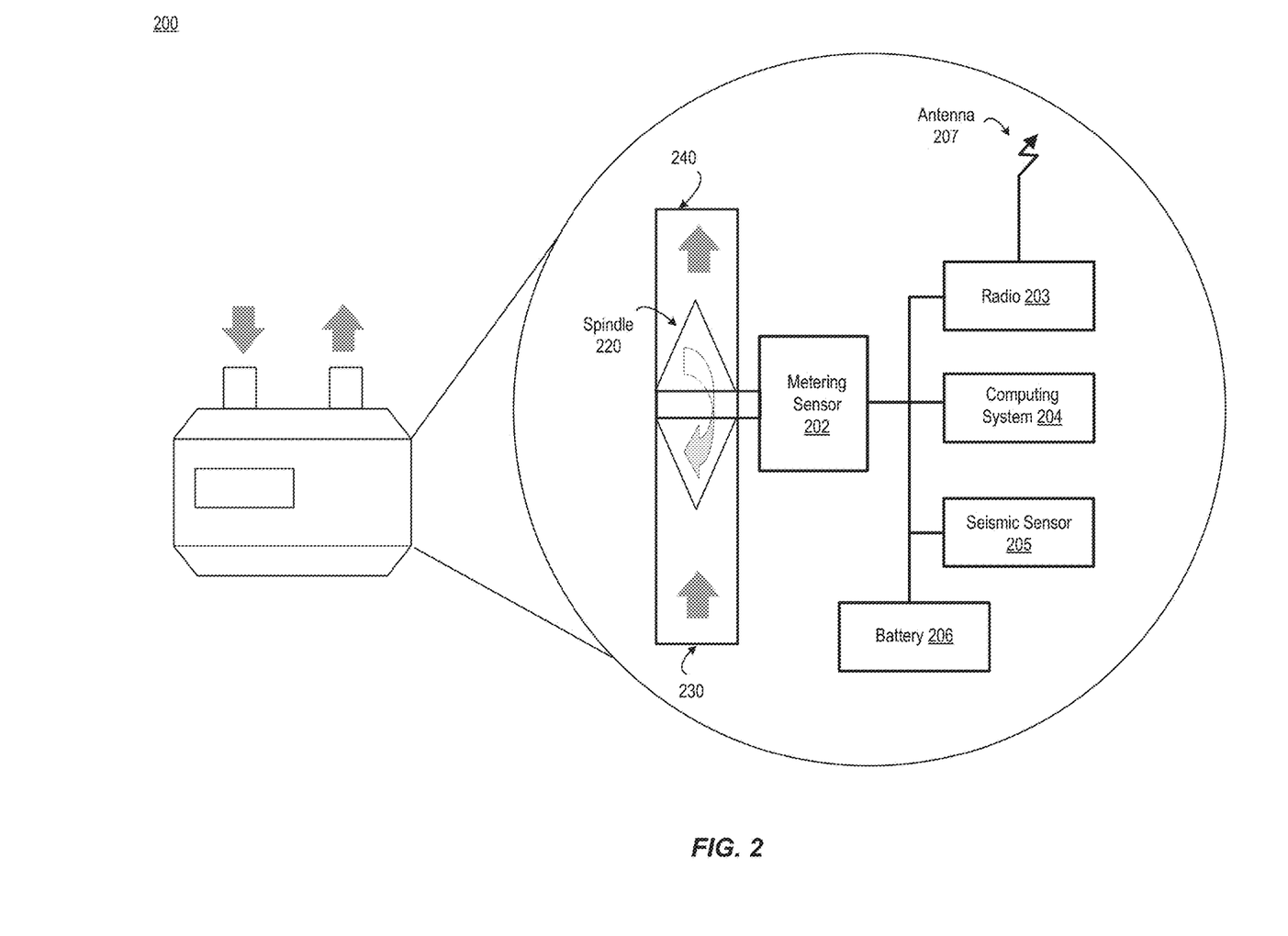
FIG. 2 is a block diagram of an exemplary metering system, according to an aspect of the present disclosure.

As discussed further with respect to FIG. 2, each meter 101-104 can be equipped with sensing and communication capabilities. For example, each meter 101-104 can include a sensor that measures flow rate or pressure and a seismic sensor that measures seismic activity in addition to a battery and a processor.

As depicted in FIG. 1, meters 101-104 and head end 140 are interconnected via network connections 130-133. The topology formed by network connections 130-133 is independent from the topology formed by gas line 120. As depicted, meter 101 is connected to meter 104 via connection 130, which is in turn connected to head end 140 via connection 131. Meter 102 is connected to head end 140 via connection 132. Meter 103 is connected to head end 140 via connection 133. Network connections 130-133 can be wired or wireless. Meters 101-104 can form a mesh network such that communications between the head end 140 and meters 101-104 can be passed through intermediate nodes. For example, as depicted, meter 104 acts as an intermediate node, connecting meter 101 and head end 140. Additionally, a given node may have multiple intermediate nodes between the node and head end 140. In other examples, a given meter can connect to a head end via a cellular network to head end 140.

Each meter 101-104 can detect seismic activity and gas flow rate. Using meter 103 as an example, under normal, or default, operation, meter 103 reports the resource flow periodically at a default rate. Reporting can include transmission of the resource flow over a communications channel, e.g., to an external device of the resource flow over one of the network connections. When seismic activity is detected, for example, as indicated by measured seismic activity that is greater than a threshold, meter 103 reports the resource flow at an event reporting rate, which can be higher than the default reporting rate. Meter 103 continues to do so at the event reporting rate for an event time period.

A gas leak can be detected using a high-flow alert. If, during the event time period, the metering device checks whether the measured resource flow exceeds a flow threshold, for example, caused by damaged gas line 125. Damaged gas line 125 is shown between meter 103 premises 113, but could be anywhere connected to output 103$b$. Meter 103 adjusts the reporting rate to an exception reporting rate, which can be higher than the event reporting rate. Meter 103 transmits communications indicating the measured resource flow at the exception reporting rate for an exception time period. Upon receiving the increased measured resource flow, head end 140 can take action. Action can include sending a message to meter 103 to disconnect premises 113 from gas line 120.

Head end 140 can provide configuration information to meters 101-104. Configuration information can include one or more of the default rate, the event period, the event rate, the exception rate, and the exception period. Each of meters 101-104 can be configured with different configuration information.

In an aspect, meters 101-104 can communicate with each other over the network connections. For example, if meter 102 detects seismic activity, then it may alert nearby meters, e.g., meter 103. In response, meter 103 can start to operate in the event mode. Similarly, if meter 103 detects an abnormal flow, e.g., caused by damaged gas line 125, then meter 103 may alert nearby meters, which in turn can start to operate in the exception mode and report resource flow at the exception rate. Additionally or alternatively, if head end 140 receives an indication of a seismic event or an abnormal flow event from a particular meter, then head end 140 can cause other meters within a geographic area to operate in event mode or exception mode accordingly.

FIG. 2 is a block diagram of an exemplary metering system, according to an aspect of the present disclosure. FIG. 2 depicts metering system 200, which includes one or more of metering sensor 202, radio 203, computing system 204, seismic sensor 205, battery 206, antenna 207, spindle 220, input 230, and output 240. In the example depicted by FIG. 2, metering system 200, operating by battery power provided by battery 206, detects and reports a flow rate measured between input 230 to output 240, detects seismic activity via seismic sensor 205 and/or increased flow rate, and adjusts the reporting rate accordingly.

Seismic sensor 205 is a sensing device that can measure seismic activity, or more generally, movements of the earth's surface. Seismic sensor 205 can output a measurement that includes separate measurements of movement in one or more dimensions, e.g., (x, y, and/or z). Examples of suitable sensing devices are seismometers, accelerometers, and other kinds of vibration sensors. Seismic sensor 205 outputs an electrical signal that is indicative of movement or vibration. Computing system 204 receives the electrical signal, and when the electrical signal indicates that movement is consistent with seismic activity, computing system 204 can take action. Seismic sensor 205 is mounted inside or outside metering system 200. In some cases, seismic sensor 205 can be located in a separate enclosure from metering system 200 and can communicate with metering system 200 wirelessly.

In some cases, computing system 204 executes a trained machine learning model. The machine learning model can be trained by providing different sensor outputs with ground truths, e.g., labeled as corresponding to a seismic event or not correspondent to a seismic event. Training can be done before metering system 200 is deployed and/or can be updated over time. For example, computing system 204 can provide the sensor data received from seismic sensor 205 to the machine learning model. In turn, the model outputs a determination of whether the movement is representative of seismic activity, or is another kind of movement such as movement caused by a passing truck.

In some cases, metering system 200 is a standalone meter complete with mechanical hardware to route the resource through the meter. In other cases, metering system 200 can attach to a legacy meter that was not originally designed for electronic measurement of resource consumption or communications capabilities, for example, by interfacing with a mechanical dial. In this manner, metering system 200 provides more sophisticated metering capabilities than previously available by docking with a mechanical index.

Metering system 200 includes one or more sensors that can measure flow rate or pressure of a resource such as gas or water. In some cases, a magnet can be attached to spindle 220 and metering sensor 202 can be a magnetic sensor such as a bipolar Hall effect sensor, bipolar magneto-resistive sensor, tunnel magnetoresistance (TMR) sensor, or any linear analog bipolar magnetic sensor. Other non-magnetic methods can be used. As the resource passes through metering system 200, spindle 220 rotates. Metering sensor 202 measures resource consumption and provides an electrical signal indicative of the consumption (e.g., an electrical pulse that occurs with every rotation). A revolution of spindle 220 can indicate that a specific volume of the resource, e.g., one cubic foot, has been consumed. The signal can be detected and recorded by the computing system 204. Examples of computing system 204 are general-purpose processors, signal processors, and controllers.

Computing system 204 can perform a variety of functions, including resource detection, seismic activity detection, and flow rate and pressure calculations. Computing system 204 receives electrical signals from metering sensor 202 and determines flow rate and/or pressure. Metering system 200 can communicate with external devices such as head end systems and other meters via radio 203. Radio 203 can communicate wirelessly via antenna 207 or via a wired connection (not depicted). For example, radio 203 can receive messages from computing system 204 and transmit the messages to a head end system.

Metering system 200 can also use flow rate detection that is separate from a detection of seismic activity. For example, flow rate detection can be useful to identify gas leaks that are not caused by seismic activity. Non-seismic flow rate thresholds can be identical to or different from flow rate thresholds. Existing flow rate detection can operate in conjunction with seismic detection. For example, during the default time period, if a flow rate threshold is exceeded, then metering system 200 can report the flow rate or trigger an alarm to an external device. Metering system 200 can continue to operate in default mode. In another example, if a non-seismic flow rate threshold is exceeded during event mode, then metering system 200 can either take action consistent with how exceeding a non-seismic flow rate threshold would be handled or move to exception mode consistent with handling a detection of exceeding a seismic flow rate threshold.

Figure 3:
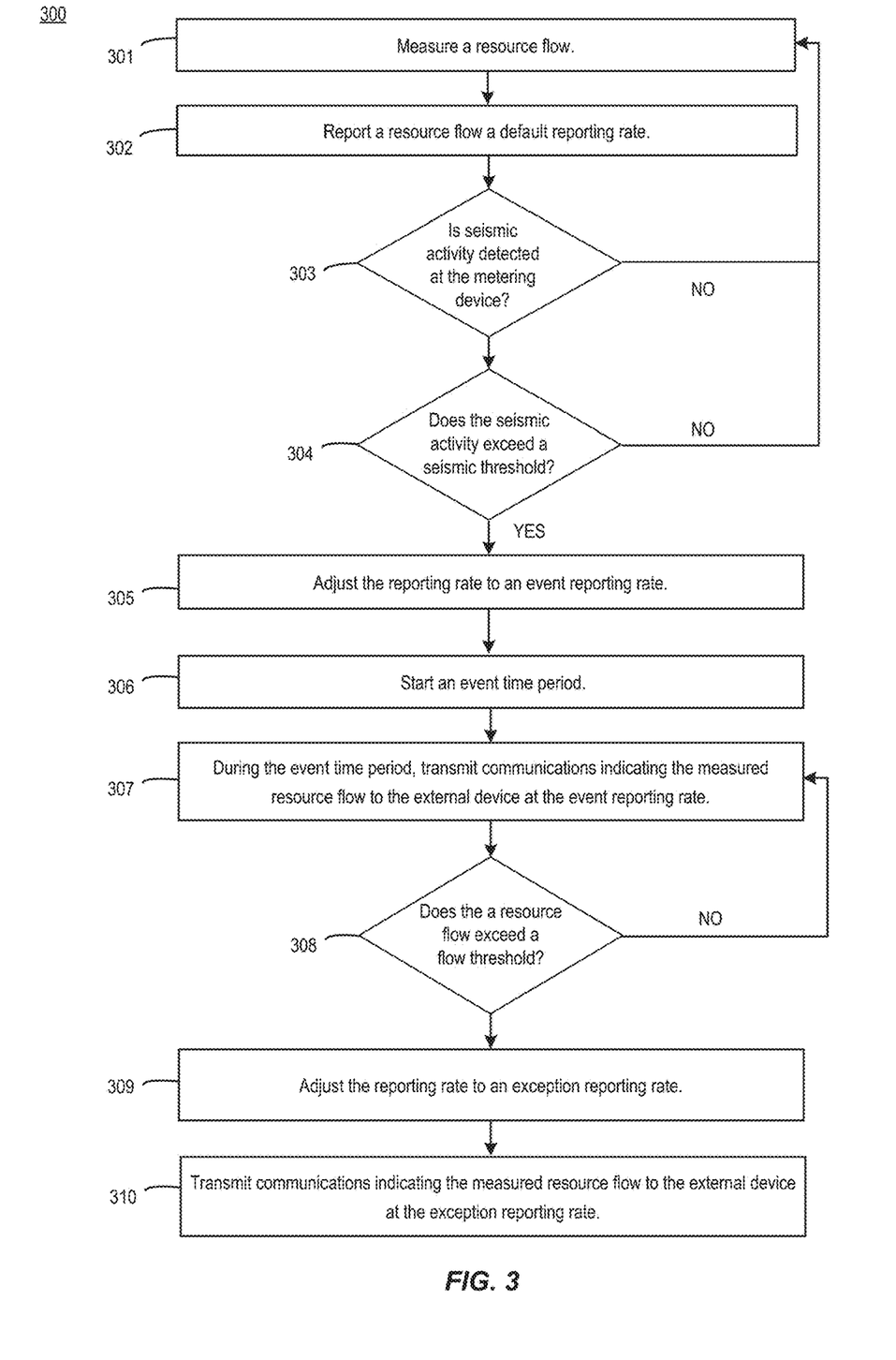
FIG. 3 is a flowchart illustrating an exemplary process for reporting resource flow, according to an aspect of this disclosure.

FIG. 3 is a flowchart illustrating an exemplary process 300 for reporting resource flow, according to an aspect of this disclosure. For illustrative purposes, process 300 is discussed with respect to metering system 200 and computing system 204. But process 300 can be implemented on other meters. Further, while blocks 301-310 are discussed in order, not all blocks are always executed and process 300 can include additional functionality in some cases.

At block 301, process 300 involves measuring a resource flow. For example, as spindle 220 turns, metering sensor 202 measures the resource flow between input 230 and output 240.

At block 302, process 300 involves setting a reporting rate to a default reporting rate. For example, if the default reporting rate is one day, then each day, metering system 200 transmits resource flow information to a head end system. The resource flow can be instantaneous, based on a period of time (e.g., the period of the reporting rate), or a statistic such an average. In some cases, reporting at the default reporting rate can be referred to as operating in a default mode.

Obtaining consumption or flow rate information can occur synchronously or asynchronously with reporting to an external device. In an aspect, metering system 200 buffers multiple samples of flow rate information, e.g., from different times during a day, and sends multiple samples at specific periods, e.g., once a day. This approach can reduce power consumption. The event reporting rate and the exception reporting rate can cause metering system 200 to cease buffering and report in real-time or closer to real-time.

At block 303, process 300 involves detecting seismic activity at the metering device. Seismic sensor 205 accesses data that includes a measurement of movement of a metering device in one or more dimensions. If seismic activity is detected, then process 300 moves to block 304. Otherwise, if seismic activity is not detected, then process 300 returns to block 301.

At block 304, process 300 involves determining whether the seismic activity exceeds a seismic threshold. By using a seismic threshold, metering system 200 can disambiguate vibrations from trucks driving by a residence where the meter is installed with earthquakes. Determining whether the activity is greater than a seismic threshold can involve comparing movement activity in one or more dimensions (e.g., x, y, or z) to one or more corresponding movement thresholds.

Continuing the example, computing system 204 determines whether seismic data received from seismic sensor 205 is greater than a seismic threshold. If the detected seismic activity is greater than the seismic threshold, then process 300 moves to block 305. Otherwise, if the detected seismic activity is less than the seismic threshold, then process 300 returns to block 301.

At block 305, process 300 involves adjusting the reporting rate to an event reporting rate. In some cases, reporting at the event reporting rate can be referred to as operating in an event mode. Continuing the example, computing system 204 adjusts the reporting rate to the event reporting rate. An example of an event reporting rate is one minute. The event reporting rate can be higher than the default reporting rate.

At block 306, process 300 involves starting an event time period. An example of typical event time period is fifteen minutes, but other durations are possible. Continuing the example, computing system 204 starts the event time period.

At block 307, process 300 involves, during the event time period, transmitting communications indicating the measured resource flow to the external device at the event reporting rate. Therefore, continuing the example, metering system 200 reports the flow rate at the event flow rate. When the event time period expires, process 300 returns to block 301 (not shown).

In some cases, a utility can send a message to metering system 200 to stop reporting at the event time rate, for example, if a utility acknowledges a presence of a leak. Therefore, during the event time period, if metering system 200 receives a command to stop, then metering system 200 returns to the default mode. Further, the metering system 200 can determine that the measurement of movement is lower than the movement threshold (or the detected seismic activity is lower than the seismic threshold), and return to the default reporting mode and/or report resource flow at the default rate.

At block 308, process 300 involves determining whether the resource flow exceeds a flow threshold. If the resource flow exceeds the flow threshold, then metering system 200 continues to block 309. If the resource flow does not exceed the flow threshold, then metering system 200 returns to block 307 and continues to monitor the resource flow.

In a residential environment, a flow rate threshold can be set at two to three times a peak flow (as determined by an expected maximum gas use, e.g., heating in the winter). For example, a typical household may have an average consumption of 200 cubic feet per day, with a peak consumption that is ten times an average consumption (e.g., 2000 cubic feet per day). Accordingly, an example of a flow rate threshold is 5000 cubic feet of gas per day. The flow rate can be scaled for a shorter evaluation period. For example, 5000 cubic feet per day equals approximately 3.5 cubic feet per minute. Other flow rate thresholds are possible.

At block 309, process 300 involves adjusting the reporting rate to an exception reporting rate. If the resource flow rate exceeds the threshold, then metering system 200 reports the resource flow at the exception reporting rate. In some cases, the exception reporting rate is greater than the event reporting rate. An example of an exception reporting rate is thirty seconds.

At block 310, process 300 involves, for an exception time period, transmitting communications indicating the measured resource flow to the external device at the exception reporting rate. An example of an exception time period is twenty-four hours. When the exception time period expires, then process 300 returns to block 301. The exception time period is optional and is not used in some cases. For example, upon detecting a resource flow greater than the flow threshold, metering system 200 can maintain the event reporting rate. When the resource flow returns to below the flow rate threshold, then metering system 200 can return to the event mode or default mode.

In some cases, a utility can send a message to metering system 200 to stop reporting at the exception reporting rate, for example, if a utility acknowledges a presence of a leak. Therefore, during the exception time period, if metering system 200 receives a command to stop, then metering system 200 returns to the default mode.

In some cases, another seismic event can be identified during the exception period. For example, after an earthquake, there can be additional earth tremors. In this case, if metering system 200 detects additional seismic activity, then metering system 200 can return to the event mode and start a new event reporting period. The reporting rate returns to the event reporting rate.

In an aspect, metering system 200 measures the resource flow rate. Metering system 200 can transmit communications indicating the measured resource flow to an external device at the default reporting rate. If metering system 200 detects that the resource flow rate has exceeded a flow threshold, then metering system 200 can adjust the reporting rate to the exception reporting rate (bypassing the event reporting rate and the event mode). Metering system 200 can send a message reporting the adjusted flow rate to a utility. Metering system 200, for an exception time period, transmits communications indicating the measured resource flow to the external device at the exception reporting rate. Upon receiving a command to reset reporting, e.g., from the utility, metering system 200 can reset the reporting rate to a default reporting rate and end the exception time period. When the resource flow returns to below the flow rate threshold, then metering system 200 can return to the event mode or default mode.

Figure 4:
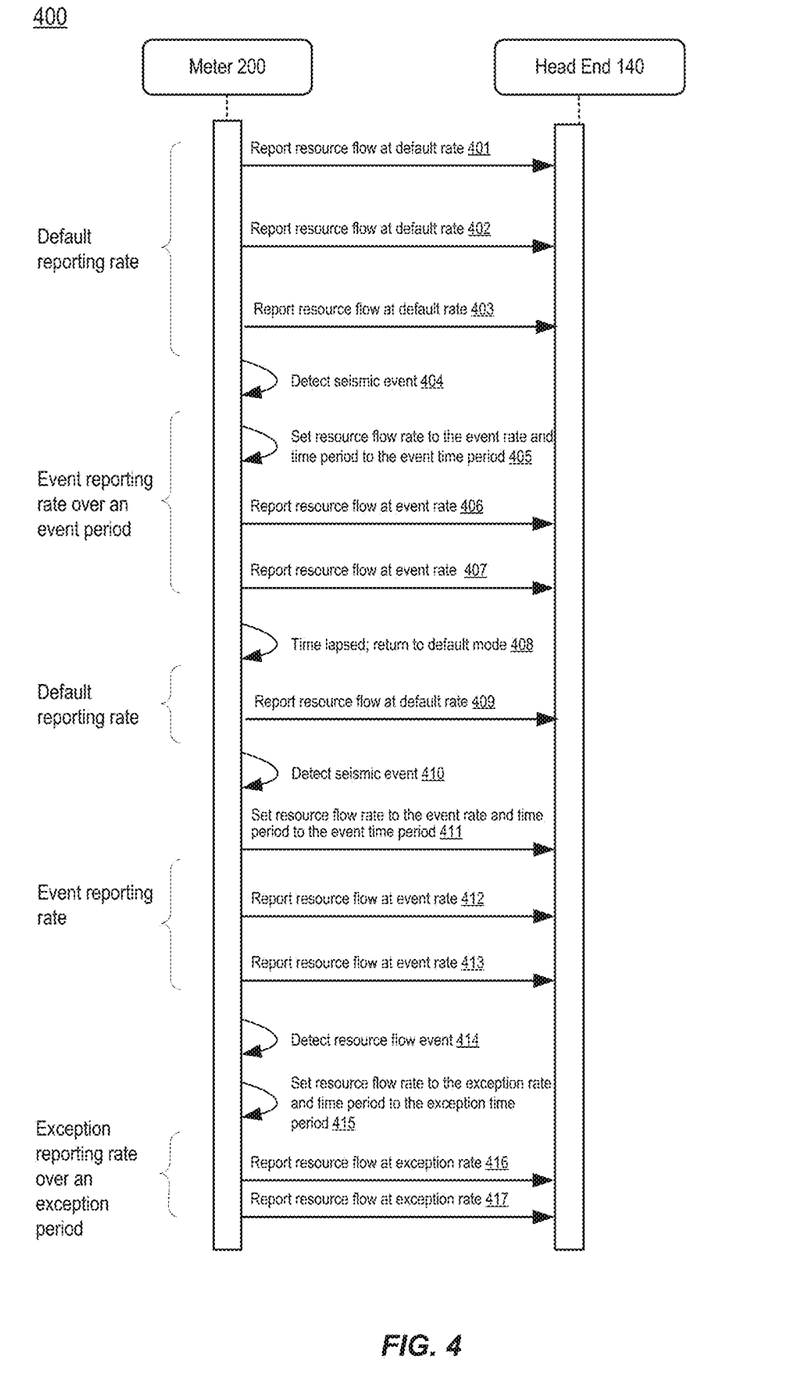
FIG. 4 is an event-flow chart depicting an example reporting resource flow, according to an aspect of the present disclosure.

FIG. 4 is an event-flow chart depicting an example reporting resource flow, according to an aspect of the present disclosure. FIG. 4 depicts signal flow 400, which represents an example of signal flow between metering system 200 and head end 140 in the context of seismic and flow events.

More specifically, metering system 200 starts at event 401 by reporting a resource flow at the default rate. Metering system 200 continues to do so at the default rate, as illustrated by event 402 and event 403. Metering system 200 then determines that a seismic event has occurred, as illustrated by event 404. Consequently, metering system 200 sets the resource flow reporting rate to the event rate and sets the event time period, as shown by event 405.

Metering system 200 then reports resource flow at the event reporting rate, as illustrated by event 406 and event 407. As illustrated by event 408, the event time period expires, and metering system 200 returns to default reporting mode. Metering system 200 reports the resource flow at the default rate, as illustrated by event 409.

At event 410, when in default mode, metering system 200 detects a seismic event. At event 411, metering system 200 sets the resource flow reporting rate to the event rate. As shown by event 412 and event 413, metering system 200 reports resource flow at the event rate. At event 414, metering system 200 identifies a flow event, where the flow event indicates a resource flow that is greater than a threshold. In response, metering system 200 reports sets the resource flow rate to the exception rate and starts the exception time period as shown by event 415. As shown by event 416 and event 417, metering system 200 reports resource flow at the exception rate.

Figure 5:
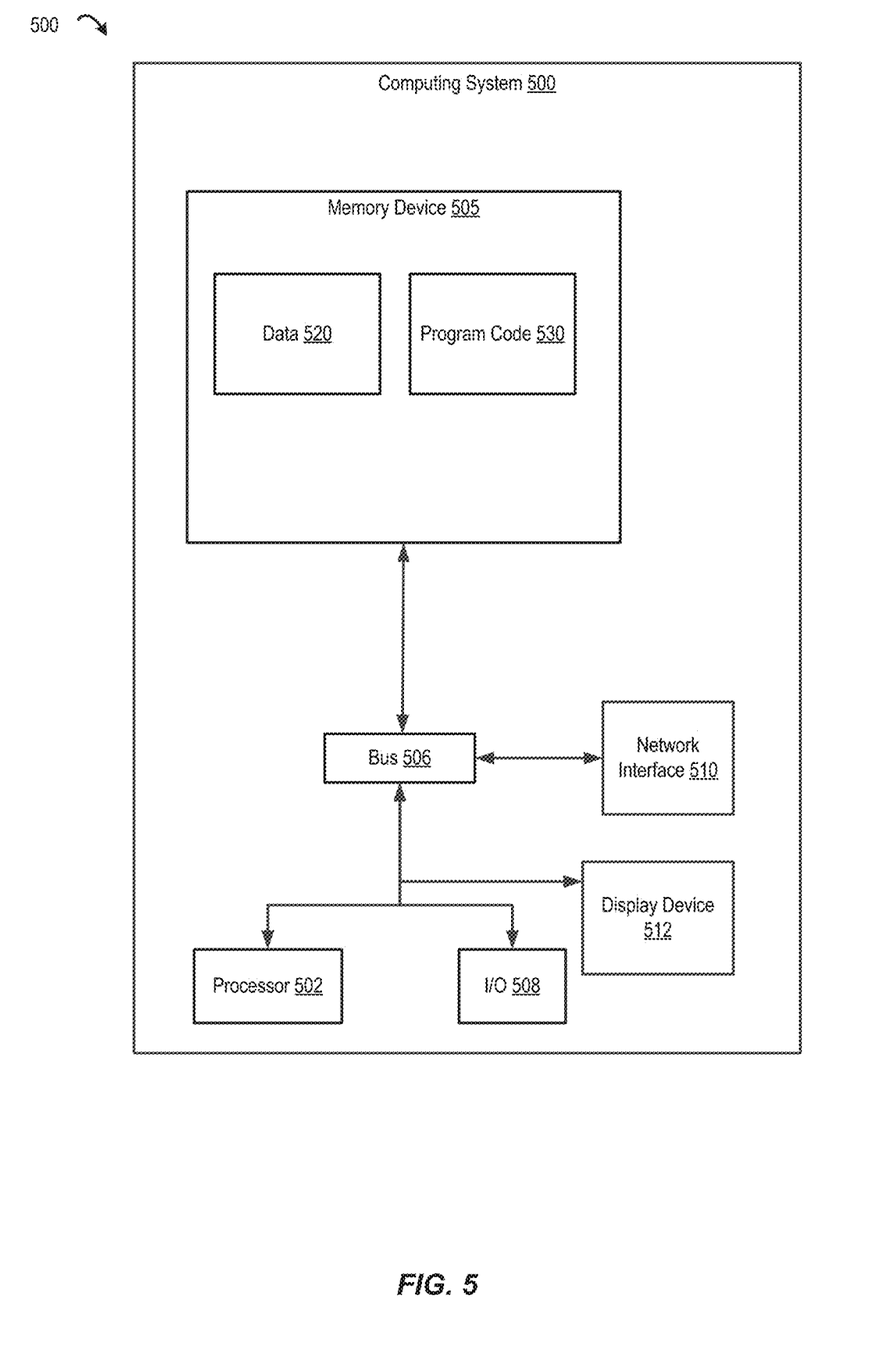
FIG. 5 illustrates an exemplary computing device, according to an aspect of the present disclosure.

FIG. 5 illustrates an exemplary computing device, according to an aspect of the present disclosure. Computing device 500 is an example of computing system 204. Computing device 500 can implement functionality described herein such as software functionality of metering system 200 or head end 140. Computing device 500 includes a processor 502 communicatively coupled to one or more memory devices 505. The processor 502 executes computer-executable program code 530 stored in a memory device 505, accesses data 520 stored in the memory device 505, or both. Examples of the processor 502 include a microprocessor, an application-specific integrated circuit ("ASIC"), a field-programmable gate array ("FPGA"), or any other suitable processing device. The processor 502 can include any number of processing devices or cores, including a single processing device. The functionality of the computing device may be implemented in hardware, software, firmware, or a combination thereof.

The memory device 505 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a flash memory, a ROM, a RAM, an ASIC, or any other medium from which a processing device can read instructions. The instructions may include processor-specific instructions generated by a compiler or an interpreter from code written in any suitable computer-programming language, including, for example, C, C++, C#, Visual Basic, Java, or scripting language.

The computing device 500 may also include a number of external or internal devices, such as input or output devices. For example, the computing device 500 is shown with one or more input/output ("I/O") interfaces 508. An I/O interface 508 can receive input from input devices or provide output to output devices. One or more busses 506 are also included in the computing device 500. The bus 506 communicatively couples one or more components of a respective one of the computing device 500.

The computing device 500 executes program code 530 that configures the processor 502 to perform one or more of the operations described herein. For example, the program code 530 causes the processor to perform the operations described in FIG. 3.

The computing device 500 also includes a network interface device 510. The network interface device 510 includes any device or group of devices suitable for establishing a wired or wireless data connection to one or more data networks. The computing device 500 can communicate with one or more other computing devices implementing the computing device or other functionality via a data network using the network interface device 510.

The computing device 500 can also include a display device 512. Display device 512 can be a LCD, LED, touch-screen or other device operable to display information about the computing device 500. For example, information could include an operational status of the computing device, network status, etc.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method of reporting a resource flow at a metering device, the method comprising:
measuring the resource flow of a resource through the metering device by measuring one or more of a pressure or a flow rate of the resource;
setting a reporting rate to a default reporting rate, wherein the reporting rate indicates a time interval for communicating with an external device;
transmitting, at the default reporting rate and to the external device, communications indicating the measured resource flow;
detecting seismic activity at the metering device;
determining that the seismic activity exceeds a seismic threshold;
in response to determining that the seismic activity exceeds the seismic threshold;
starting a predetermined event time period, wherein the predetermined event time period has a predetermined length and starts after determining that the seismic activity exceeds the seismic threshold;
adjusting the reporting rate to an event reporting rate that is different than the default reporting rate;
during the predetermined event time period, transmitting, at the event reporting rate and to the external device, the communications indicating the measured resource flow; and
in response to determining that the predetermined event time period is complete, transmitting to the external device and at the default reporting rate, the communications indicating the measured resource flow.

2. The method of claim 1, wherein said detecting the seismic activity at the metering device comprises:
accessing sensor data comprising a measurement of movement of the metering device in one or more dimensions; and
determining that the measurement of the movement is greater than a movement threshold.

3. The method of claim 1, wherein the measured resource flow is a measure of gas flow through the metering device.

4. The method of claim 1, wherein the event reporting rate is greater than the default reporting rate.

5. The method of claim 1, further comprising:
during the predetermined event time period, determining that the resource flow exceeds a flow threshold; and
in response to determining that the resource flow exceeds the flow threshold;
adjusting the reporting rate to an exception reporting rate, wherein the exception reporting rate is different from the event reporting rate; and
for an exception time period, transmitting, to the external device, additional communications indicating the measured resource flow at the exception reporting rate.

6. The method of claim 5, further comprising responsive to receiving a command to reset the reporting rate, resetting the reporting rate to the default reporting rate and ending the predetermined event time period or the exception time period.

7. The method of claim 5, wherein the event reporting rate is greater than the default reporting rate and wherein the exception reporting rate is greater than the event reporting rate.

8. The method of claim 1, further comprising:
accessing additional sensor data comprising an additional measurement of movement in one or more dimensions; and
in response to identifying, from the additional measurement of the movement, an additional seismic event, setting the predetermined event time period as expired and resetting the reporting rate to the default reporting rate.

9. A method of reporting a resource flow at a metering device, the method comprising:
measuring the resource flow of a resource through the metering device by measuring one or more of a pressure or a flow rate of the resource;
while operating in a default mode:
setting a reporting rate to a default reporting rate;
transmitting, at the reporting rate and to an external device, communications indicating the measured resource flow, wherein the reporting rate indicates a time interval for communicating with the external device;
detecting seismic activity at the metering device;
determining that the seismic activity exceeds a seismic threshold; and
in response to determining that the seismic activity exceeds the seismic threshold, starting a predetermined event time period and begin operating in an event mode, wherein the predetermined event time period has a predetermined length and starts after determining that the seismic activity exceeds the seismic threshold;

while operating in the event mode:

adjusting the reporting rate to an event reporting rate that is different than the default reporting rate; and transmitting, at the event reporting rate and to the external device, the communications indicating the measured resource flow; and in response to determining that the predetermined event time period is complete, operating in the default mode.

10. The method of claim 9, further comprising:

while operating in the event mode:

determining that the resource flow exceeds a flow threshold; and in response to determining that the resource flow exceeds the flow threshold, ending the predetermined event time period and begin operating n an exception mode; and while operating in the exception mode:

adjusting the reporting rate to an exception reporting rate, wherein the exception reporting rate is different from the event reporting rate; and transmitting additional communications indicating the resource flow to the external device at the exception reporting rate.

11. The method of claim 10, wherein the event reporting rate is greater than the default reporting rate and wherein the exception reporting rate is greater than the event reporting rate.

12. The method of claim 10, further comprising:

accessing additional sensor data comprising an additional measurement of movement in one or more dimensions; and in response to identifying, from the additional measurement of the movement, an additional seismic event, ending the predetermined event time period and returning to the default mode.

13. The method of claim 10, wherein when the resource flow returns below the flow threshold, adjusting the reporting rate to the default reporting rate and returning to the event mode.

14. A metering device comprising:

a radio configured to communicate with an external device;

a seismic sensor configured to measure movement of the metering device in one or more dimensions;

a flowrate sensor configured to measure a resource flow of a resource through the metering device by measuring one or more of a resource flow rate or pressure of the resource; and a processor configured to perform operations comprising:

receiving, from the flowrate sensor, a measurement of the resource flow by measuring the one or more of the resource flow rate or the pressure of the resource;

setting a reporting rate to a default reporting rate, wherein the reporting rate indicates a time interval for communicating with the external device;

causing the radio to transmit, to the external device at the reporting rate, a communications indicating the measurement of the resource flow;

receiving, from the seismic sensor, a measurement of seismic activity at the metering device;

determining that the measurement of the seismic activity exceeds a seismic threshold; and in response to determining that the measurement of the seismic activity exceeds the seismic threshold;

starting a predetermined event time period, wherein the predetermined event time period has a predetermined length and starts after determining that the measurement of the seismic activity exceeds the seismic threshold;

adjusting the reporting rate to an event reporting rate that is different than the default reporting rate;

during the predetermined event time period, causing the radio to transmit, to the external device at the event reporting rate, the communications indicating the measurement of the resource flow; and in response to determining that the predetermined event time period is complete, transmitting to the external device, the communications indicating the measurement of the resource flow at the default reporting rate.

15. The metering device of claim 14, wherein the seismic sensor is an accelerometer.

16. The metering device of claim 14, wherein said receiving, from the seismic sensor, the measurement of the seismic activity at the metering device comprises:

accessing: from the seismic sensor, sensor data comprising a measurement of movement of a, the metering device in the one or more dimensions; and determining that the measurement of the movement is greater than a movement threshold.

17. The metering device of claim 14, wherein the measurement of the resource flow is a measure of gas flow through the metering device.

18. The metering device of claim 14, the operations further comprising:

during the predetermined event time period, determining that the measurement of the resource flow exceeds a flow threshold; and in response to determining that the measurement of the resource flow exceeds the flow threshold;

adjusting the reporting rate to an exception reporting rate, wherein the event reporting rate is greater than the default reporting rate; and for an exception time period, transmitting additional communications indicating the measurement of the resource flow to the external device at the exception reporting rate.

19. The metering device of claim 18, the operations further comprising: upon in response to receiving a command to reset the reporting rate, resetting the reporting rate to the default reporting rate and ending the predetermined event time period or the exception time period.

20. The metering device of claim 18, the operations further comprising: in response to determining that the measurement of the seismic activity is lower than a seismic activity threshold, resetting the reporting rate to the default reporting rate and ending the predetermined event time period or the exception time period.

21. The metering device of claim 18, wherein the event reporting rate is greater than the default reporting rate and wherein the exception reporting rate is greater than the event reporting rate.

22. The metering device of claim 14, the operations further comprising:

accessing additional sensor data comprising an additional measurement of movement in the one or more dimensions; and in response to identifying, from the additional measurement of the movement, an additional seismic event, resetting the reporting rate to the default reporting rate.

\* \* \* \* \*